United States Patent [19]
Kasin et al.

[11] 3,724,587
[45] Apr. 3, 1973

[54] SUSPENSION FOR PIVOTAL TRACK FRAMES ON TERRAIN MOTOR VEHICLES

[75] Inventors: Hans Kasin; Odd Krane Thvedt, both of Notodden, Norway

[73] Assignee: Christiania Spigerverk, Division JOBU, Oslo, Norway

[22] Filed: Apr. 5, 1971

[21] Appl. No.: 131,052

[52] U.S. Cl. ................................................180/9.54
[51] Int. Cl. ............................................B62d 55/10
[58] Field of Search..............180/9.5, 9.54, 9.64, 41; 280/104.5 A

[56] References Cited

UNITED STATES PATENTS

| | | | |
|---|---|---|---|
| 1,429,474 | 9/1922 | Wickersham | 180/9.5 |
| 2,537,745 | 1/1951 | Daniels | 305/27 |
| 2,434,693 | 1/1948 | Graham | 180/9.54 |
| 2,951,710 | 9/1960 | Willetts | 280/104.5 A |
| 1,985,777 | 12/1934 | Hamilton | 180/9.64 X |

*Primary Examiner*—Richard J. Johnson
*Attorney*—Wenderoth, Lind & Ponack

[57] ABSTRACT

A suspension for pivotal track frames on terrain motor vehicles of the kind where the tractor body is supported by one single pivotal track frame on opposite sides of the body. The frames are provided with track wheels or belts. The new suspension comprises a journal bushing fixed to each of the pivotal frames and defining the pivot axis therefore. In the bushing are positioned thick-walled, solid tube-shaped elastic linings made of rubber or the like and which encompass a coaxially extending support beam mounted to the tractor body. The outside and the inside surfaces of the elastic linings are not rotatably joined to the inside of the bushing and the outside of the beam, respectively, such that the pivotal movements of the track frames when the tractor is moving through terrain take place under flexible deformation of the linings, which linings thus operate as spring suspensions and shock absorbers.

1 Claim, 1 Drawing Figure

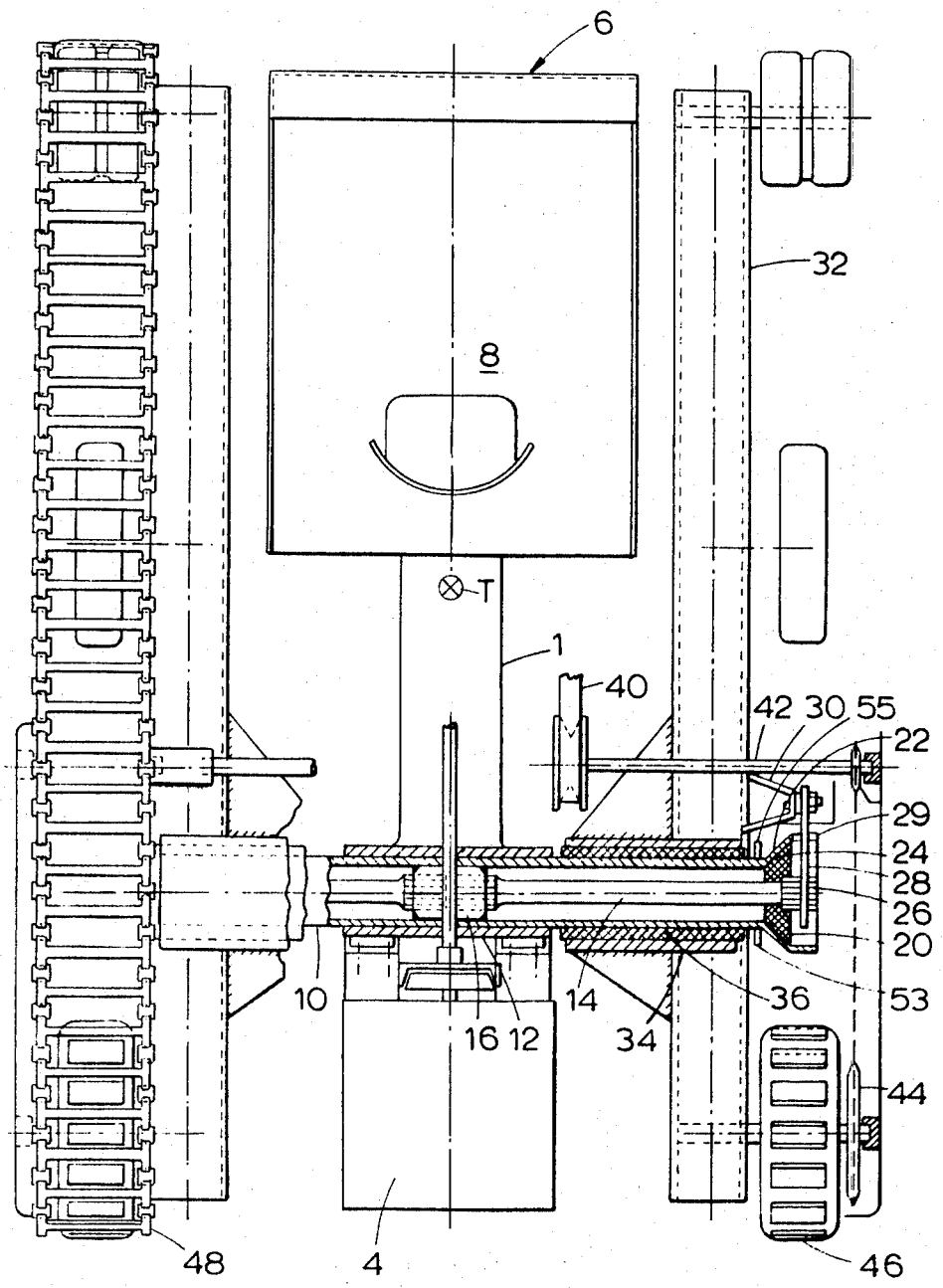

SUSPENSION FOR PIVOTAL TRACK FRAMES ON TERRAIN MOTOR VEHICLES

The present invention relates generally to terrain motor vehicles, more particularly to a suspension for pivotal track frames on such vehicles.

The invention shall in the following be described in connection with belt tractors, but it shall be understood that the invention is also applicable to tractors with pivotal bogies provided with track wheels.

The present invention relates to pivotal track frames of the kind including spring means which partially support the tractor body, and partially suspend the track frames.

PRIOR ART

U.S. Pat. No. 2,654,614 relates to a suspension whereby the fore part of the tractor body is provided with a laterally extending leaf spring means, the outer end of which is in engagement with each of the pivotal track frames. The track frames are pivotally supported at a distance behind the leaf spring means.

From Swedish patent No. 126,044 is known a tractor design whereby the vehicle is provided with a single pivot frame for the track wheels and/or the belts on opposite sides of the tractor body. Between the pivotal frames and the chassis or tractor body is provided torque suspension means, the frames being coupled together such that a turning movement of one of the tracks relative to the tractor body in one direction results in a corresponding turning movement of the other track frame in the opposite direction.

A drawback with known terrain motor vehicles of this kind is that it has proved difficult to provide an ideal combination of good spring suspension, satisfactory terrain moving properties, avoidance of vibrations and/or bumps and finally too much wear on the vehicle as such.

The principle object of the present invention is therefore to provide an improved terrain motor vehicle which thus possesses good stability in the terrain, improved ability to drive in rough terrain, and which furthermore provides relatively good driving comfort with avoidance of excessive bumps and vibrations.

The suspension for pivotal track beams on terrain motor vehicles in accordance with the invention is of the kind where the tractor body is supported by pivotal track frames on opposite sides of the body, which frames are provided with track wheels or belts. The suspension comprises a hollow bushing fixed to each of the pivotal frames and defining the pivot axis, the bushings extending transversely towards the tractor body. In the bushings are positioned thick-walled, solid tube-shaped elastic linings made of rubber or the like, which encompass a likewise transversely coaxially extending support beam mounted to the tractor body. The outside and the inside surfaces of the elastic linings are non-rotatably joined to the inside of the bushing and the outside of said beam, respectively, the pivotal movements of the track frames when the tractor is moving through terrain taking place under flexible deformation of the linings, which linings thus operate as spring suspensions and shock absorbers.

A characteristic operational feature of the suspension in accordance with the invention is that either pivotal track frame may pivot a quite large degree without influencing the position or state of the tractor body and/or the other pivotal track frame, the latter thus maintaining full track position relative to the ground.

The common pivot axis of the pivotal track frames is preferably arranged at a predetermined distance behind the mid-point of each respective track frame, that is behind the mid-point between the foremost and the rearmost supporting point against the ground. The resulting outer of gravity of the tractor, taking into account the chassis with engine, driver, load etc., is preferably arranged at a distance ahead of the pivot axis. The magnitude or size of the moments transferred from the tractor and which must be absorbed by the elastic linings will thus be the total weight of the tractor multiplied by the minimum distance from the center of gravity thereof to the line or axis through the support shaft. When the vehicle stands on horizontal ground, 50 percent of the torque load will be absorbed by each belt bogie, which torque further results in a corresponding torque in the belt, and which is balanced by a correspondingly large upwardly directed moment against the fore part of the belt.

When the belt during driving hits an obstruction and receives a relatively large proportion of the torque from the tractor body, and the other belt bogie receives correspondingly less torque, the tractor body will position itself in an intermediate position or level between the angular positions of each of the belt bogies.

The invention will be better understood by the following description taken in connection with the accompanying drawing, wherein there is illustrated an embodiment of a suspension in accordance with the invention, the single FIGURE showing a plan view, partly in section, of a motor vehicle provided with a suspension in accordance with the invention.

In the FIGURE the reference number 1 designates the tractor body or chassis, on the rear portion of which is positioned the engine 4. The chassis has a fore part 6 including an area 8 for the driver. The chassis 1 is rigidly connected, for instance welded or bolted, to the support beam 10 via a support hub 12. The support beam 10 is designated as a hollow cylinder as shown. In the FIGURE the right part of the support beam 10 with corresponding parts are shown in section for the sake of clarity, and since the right part and the left part of the vehicle are identical, it is only necessary to describe one of these parts.

Inside the hollow support beam 10 is, in the illustrated embodiment, journalled a torsion rod 14 the inner end of which is rigidly connected in a block 16 which is rigidly connected to the support beam 10. The outer end of the torsion rod 14 is supported in a rubber packing 20, which is provided with a conical outside 22, which rests against a complementary conically shaped end portion 24 of the support beam 10. The outer end 18 of the torsion rod is provided with an enlarged, not circular, end portion or extension 26 which firstly serves to keep the rubber packing 20 in place and secondly serves as a non-rotatable support for a lever arm 28, the outer end of which is fixed, for instance by means of bolts, to a bracket 30 which constitutes a rigid part of the pivot beam or frame 32 for the belt bogie.

On the pivot beam 32 is mounted a relatively long, transversally extending, strong journal bushing 34 which rotatably encompasses the support beam 10. Between the bushing 34 and the beam is provided a substantial clearance which is filled with a thick tube-shaped lining 36 of rubber which thus serves as spring means and bumper means and is in non-rotatable engagement with the support beam as well as with the journal bushing 34. All pivotal movements and torques transferred from the track frames are absorbed by rubber linings 36 which thus are subjected to a constant, but varying elastic deformation during the driving. Please note that the use of torsion rods 14 as shown as an additional torque absorbing means is auxiliary and in most cases superfluous.

The power transfer from the engine of the tractor chassis to each of the belt drives constitutes no part of the present invention and may be solved in several per se conventional fashions. In the motor vehicle shown in the drawing the power transfer from the motor on the tractor body to each of the belt bogies take place via a V-belt system 40. As shown in the FIGURE the torque from the motor 4 is transferred via the V-belt 40 to one on the bogie drive shaft 42 which over the chain drive 44 transfers the power to the wheel 46 for the belt 48. (Removed on the right side of the tractor in the FIGURE).

The center of gravity for the entire tractor is designated with the letter T. The exact position of the center of gravity will naturally vary in accordance with the load which at any time is put on the tractor. The weight P on the tractor will however generate a torque $$M = P \cdot a,$$

wherein $a$ is the horizontal distance from the center of gravity to the vertical axis through the support beam. This moment or torque will in the illustrated embodiment, via the support beam 10 and the lever arm 28 be transferred to the rubber linings and the torsional rods 14, simultaneously as the belts through the belt bogies provide the necessary, oppositely directed torque such that balance is obtained.

Each pivotal track frame will, via the belts or wheel bogies, absorb respective parts of the prevailing torque and in the torque absorbing means will exist corresponding, oppositely directed torques. When the belt bogies are parallel viewed from the side, the moments in each of the rubber linings and possible torsional rods will be equal. When the bogies are in an angular position relative to each other, the bogie which is directed more upwardly than the other will receive a relatively greater proportion of the torque from the tractor body, and possibly also a part of the torque stemming from the other bogie, with the consequence that the torque absorbing means of that part of the tractor will receive a greater part, possibly the entire torque, from the tractor simultaneously as the tractor body turns the torque absorbing means further. This has the effect that the tractor body always will position itself at a level or at an angle between the angular positions of the respective belt bogies.

When building a tractor in accordance with the invention it has proved achievable to arrange the center of gravity of the tractor chassis or body relatively far ahead of the pivot axis since thereby one obtains a relatively large pressure against the fore part of the track frames, whereby it occurs that the belts (or the front wheel in a wheel bogie) gets a good grip or track against the ground surface also when the vehicle is driven steeply uphill. It is furthermore possible to arrange the pivot axis a good distance behind the midpoint of each track frame.

One may provide special bumpers or shock absorbers between the support beam and each respective track frame, but such means has not proved necessary, among other reasons because of the special power transfer arrangement as shown, whereby the engine power is transferred via V-belts to a drive shaft on each of the belt bogies, which drive shaft is not exactly concentric with the pivot axis of the belt bogies.

In order to limit the pivotal movements of each bogie one may on the support beam 10 attach stop members 53, or alternatively an extended cylindrical part 29 of the support beam 10 provided with a torque lever arm 28, extended through an opening in the beam, such that the opposing end walls in the opening form abutments providing limitations for the pivotal movements of the lever arm 28 and thereby the pivotal movements of each of the track frames.

A motor terrain vehicle in accordance with the invention will possess excellent terrain moving qualities, among other reasons because the belt bogie can undergo very large pivotal movements relative to each other, such that for instance one of the bogies may pass over a very large bump in the terrain, for instance a large stone, without influencing the stability of the vehicle. This is possible because the tractor chassis or body itself will not follow upward and take part in the upwardly pivoting movement of the belt, and furthermore because the other belt to a large degree will remain in full track engagement with the ground surface.

It is furthermore most feasable to utilize relatively large elastic linings as torque absorbing means. In addition to elastic linings, usually made of rubber, one may also utilize torsion rods but trials have shown that additional torsional rods are not necessary if the total weight of the vehicle does not exceed 3–4 tons. The use of torsion rods implies that the flexible movements of the pivotal beams and thus the spring action will be more rigid or stiff having for instance the effect that when one belt bogie hits a large unevenness and thus is pressed upwardly from the ground, the other belt bogie will also have a tendency to move upwardly. This is not desirable since thereby the stability of the vehicle will be hampered and the track effect will be reduced.

Utilization of relatively elongated journal bushings 34 including the elastic linings for supporting the track frames have proved to involve a very satisfactory solution, since the design provides a very simple and rugged construction with relatively small bending stresses in the support system, among other reasons because the length of the journal bushings reduces bending stresses. The rubber linings operate also as bumpers both versus shocks straight against the belts and against lateral bump and impacts against the bogies. As well known the bogies on belt tractors are subjected to severe stresses and strains during driving in rough terrain. The belt bogies will thus be subjected to lateral forces, for instance during turning movements which usually take place by driving the one belt at a larger speed than the other, with the effect that the belts skid on the ground. Practical trial has shown that the rubber linings not only operate very effectively as torque and spring means, but also operate as effective bumpers against shock and impact loads.

What is claimed is:

1. A terrain vehicle comprising:
   a. a vehicle body having a center of gravity;
   b. a pair of pivotal track frames positioned on opposite sides of said vehicle body and extending longitudinally substantially the length thereof;
   c. a support beam extending transversely of said vehicle body and rigidly attached thereto rearwardly of said center of gravity;
   d. a pair of journals, one of said journals extending transversely of each of said track frames and rigidly attached thereto rearwardly of the longitudinal midpoint thereof;
   e. a pair of resilient linings, each having inner and outer surfaces, one of said linings being positioned within each of said journals and surrounding said support beam, said inner surfaces of said linings being non-rotatably joined with said support beam, and said outer surfaces of said linings being non-rotatably joined with said journals, said linings thereby being torsionally stressed by said vehicle body; and
   f. said support beam, said linings and said journals concentrically defining a pivot axis positioned rearwardly of said center of gravity of said vehicle body and said midpoints of said track frames, said track frames thereby being independently, resiliently, pivotally mounted for movement around said pivot axis.

* * * * *